(12) United States Patent
Ahouanto et al.

(10) Patent No.: US 6,505,663 B2
(45) Date of Patent: Jan. 14, 2003

(54) RADIAL TIRE WITH NO BEAD WIRE

(75) Inventors: Michel Ahouanto, Enval (FR); Luc Bestgen, Chatel-Guyon (FR); Forrest Patterson, Clermont-Ferrand (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 100 days.

(21) Appl. No.: 09/767,566

(22) Filed: Jan. 23, 2001

(65) Prior Publication Data

US 2001/0025680 A1 Oct. 4, 2001

Related U.S. Application Data

(63) Continuation of application No. PCT/EP99/04462, filed on Jun. 28, 1999.

(30) Foreign Application Priority Data

Jul. 23, 1998 (FR) .............................. 98 09452

(51) Int. Cl.$^7$ .......................... B60C 15/00; B60C 15/04; B60C 15/06
(52) U.S. Cl. ................. 152/542; 152/539; 152/540; 152/543; 152/546; 152/547; 152/550; 152/552
(58) Field of Search ................... 152/542, 543, 152/539, 540, 550, 552, 547, 546

(56) References Cited

U.S. PATENT DOCUMENTS

| 2,966,933 A | 1/1961 | Boussu et al. |
| 5,961,756 A | 10/1999 | Ahouanto et al. |

Primary Examiner—Adrienne C. Johnstone
(74) Attorney, Agent, or Firm—Baker Botts L.L.P.

(57) ABSTRACT

A tire having two beads and a radial carcass reinforcement, each bead having no anchoring bead wire and being reinforced by an armature including at least two plies turned up over themselves to form four reinforcement layers axially close to one another, the two axially innermost layers being composed of elements parallel to one another from one layer to the next, and the two layers axially at the center being composed of elements crossed from one layer to the next, and the reinforcement layers have their radially outer edges positioned within the bead at different heights such that any annular strip of the reinforcement armature of the bead, having at least two layers of reinforcement elements and located between two parallels to the rotation axis of the tire, is formed of at least two layers of reinforcement elements crossed from one layer to the next.

6 Claims, 3 Drawing Sheets

RADIAL TIRE WITH NO BEAD WIRE

This is a continuation of pending international application PCT/EP99/04462, filed Jun. 28, 1999, which was published in French on Feb. 3, 2000 as international publication WO 00/05084 and which claims priority of French Application No. 98/09452, filed Jul. 23, 1998.

BACKGROUND OF THE INVENTION

The invention concerns tire covers with carcass reinforcement overlaid radially by a crown reinforcement consisting of at least two plies of reinforcement elements parallel to one another within each ply and crossed from one ply to the next, which for an acute angle with the circumferential direction.

Patent application EP-A-672 547 describes a tire cover having no bead wire, but which comprises an annular element whose tensile strength is substantially less than would be necessary for a bead wire in a known tire of the same size, and at least one bead reinforcement armature consisting of two reinforcing layers in contact with or close to the annular element, the combination of these layers having a tensile rupture strength at least equal to that necessary for a bead wire in a known tire of the same size. The mechanical strength of the bead reinforcement armature is thus the essential contribution to the mechanical strength of the bead reinforcement combination consisting of the annular element and the said armature, so that the combination can replace the bead wire of a classical tire.

The example described in the European application shows a bead reinforcement armature consisting on the one hand of two adjacent reinforcement plies with their respective radially lower ends in contact with the annular element and extending radially above the said element.

An additional reinforcement ply surrounds the annular element and the first two plies, so forming two elementary layers applied on either side against the first layers which are accordingly sandwiched between the elementary layers, such that the four layers in contact are practically parallel to one another.

The bead reinforcement armature can also comprise only two reinforcement layers, for example such as the fist plies described above with the ply turned up over itself to form two layers. The first two layers can be obtained by folding a single ply, and this gives a bead reinforcement armature with four layers, the said layers formed by turning up over themselves two respective plies.

Cases have also been envisaged in which the carcass ply is positioned between the reinforcement layers with the carcass ply wrapped directly around the annular element and the two reinforcement plies wrapped around the carcass ply and the annular element.

The reinforcement elements of one reinforcement layer are crossed with those of the adjacent or axially closest reinforcement layer(s), in other words the respective elements of two layers adjacent or axially closest to one another are not parallel to one another.

The best solutions from the endurance standpoint seem to be those in which the reinforcement layers of cords or cables crossed from one layer to the next are obtained by turning up a single ply over itself. The folding or turning up of one or two superimposed plies that make angles between 0° and 10° with the circumferential direction is a delicate operation. The production of a tire comprising beads reinforced in the manner described above poses additional manufacturing problems too, because obtaining a precise position of the various bead elements is unsatisfactory since the said elements are too disarranged during the stages of building up, shaping and curing; this results in irregular quality and properties in the series of tires produced.

SUMMARY OF THE INVENTION

The purpose of the invention is to propose a tire cover of the type described above which can be fabricated more easily and with more reliable regularity of the tire properties.

The tire according to the invention comprises a carcass reinforcement overlaid by a crown reinforcement, itself covered radially by a tire tread connected to two beads by two side walls, each bead having no anchoring bead wire and the said carcass reinforcement extending from one bead to the other, and is characterized in that each bead is reinforced by an armature comprising at least two plies turned up over themselves to form four reinforcement layers axially close to one another, each of the said layers comprising reinforcement elements parallel to one another within each layer and making with the circumferential direction an angle α such that $0° < \alpha, \leq 10°$; the two axially innermost layers being composed of elements parallel to one another from one layer to the next and the two layers axially at the center of the armature composed of elements crossed from one layer to the next, such that the combination of reinforcement layers has a tensile rupture strength measured in the circumferential direction at least equal to the strength required for a bead wire in a known tire of the same size, and the reinforcement layers have their radially outside ends arranged in the bead at different heights, such that any annular strip of the bead reinforcement armature comprising at least two layers of reinforcement elements and located between two parallels of the tire is formed of at least two layers of reinforcement elements crossed from one layer to the next.

The above structure makes it possible when fabricating the tire to omit an annular element whose longitudinal tensile rupture strength is substantially less than would be necessary for a bead wire in a known tire of the same size, the axis of the said annular element being the rotation axis of the tire. On the other hand, the presence of the said element advantageously fulfils another function: that of filling the radially lower part of the bead so as to confer upon that part an axial width compatible with the width of the rim seat on which the tire will be fitted, and compatible with the rim tightness required to prevent any rotation on the rim.

Although the turn-up of the carcass reinforcement and the main part of the carcass reinforcement corresponding to it may be located axially between the two axially innermost reinforcement armature layers and the two axially outermost layers of the said reinforcement, it is advantageous for the carcass reinforcement to be wrapped around the radially lower part of the bead reinforcement armature, the part formed by turning up the two reinforcement plies. The turn-up of the carcass reinforcement can also be inserted between the two axially outermost layers, while the main portion of the carcass reinforcement corresponding thereto is inserted between the two axially outermost layers.

It is also advantageous for the section which covers the bead on the outside at least axially, the part of the said protective section or layer intended to come into contact with the rim at least in the area of the rim flange when the tire is fitted, to be made from a rubber mix which, in the vulcanized state, has a dynamic elastic loss modulus G" of less than 1, G" being expressed in MPa (megapascals), the said modulus being measured at 10% shear, at a temperature of 50° C. and with a frequency of 10 Hz, and the said section being at most 2 mm thick.

The term 'reinforcement elements of the turned-up plies of the bead reinforcement armature' should be understood to mean cords as well as cables. A cord may consist of a single monofilamentary or multifilamentary strand, whereas a cable may or may not have a central core.

The material constituting the reinforcement elements may vary, being for example metallic and especially steel, but is preferably a natural or synthetic textile such as a cellulose, polyester, or aliphatic and preferably aromatic polyamide material, in particular aramide cords; it may also be mineral, for example glass or carbon, and each cable can comprise several of the materials mentioned (these being known as mixed cables).

BRIEF DESCRIPTION OF THE DRAWING

The characteristics of the present invention will be understood more clearly on reading the description with respect to the following drawings in which:

FIG. 2 is a schematic representation of a second variant of a bead according to the invention; and.

DESCRIPTION OF PREFERRED EMBODIMENTS

Figure 1:
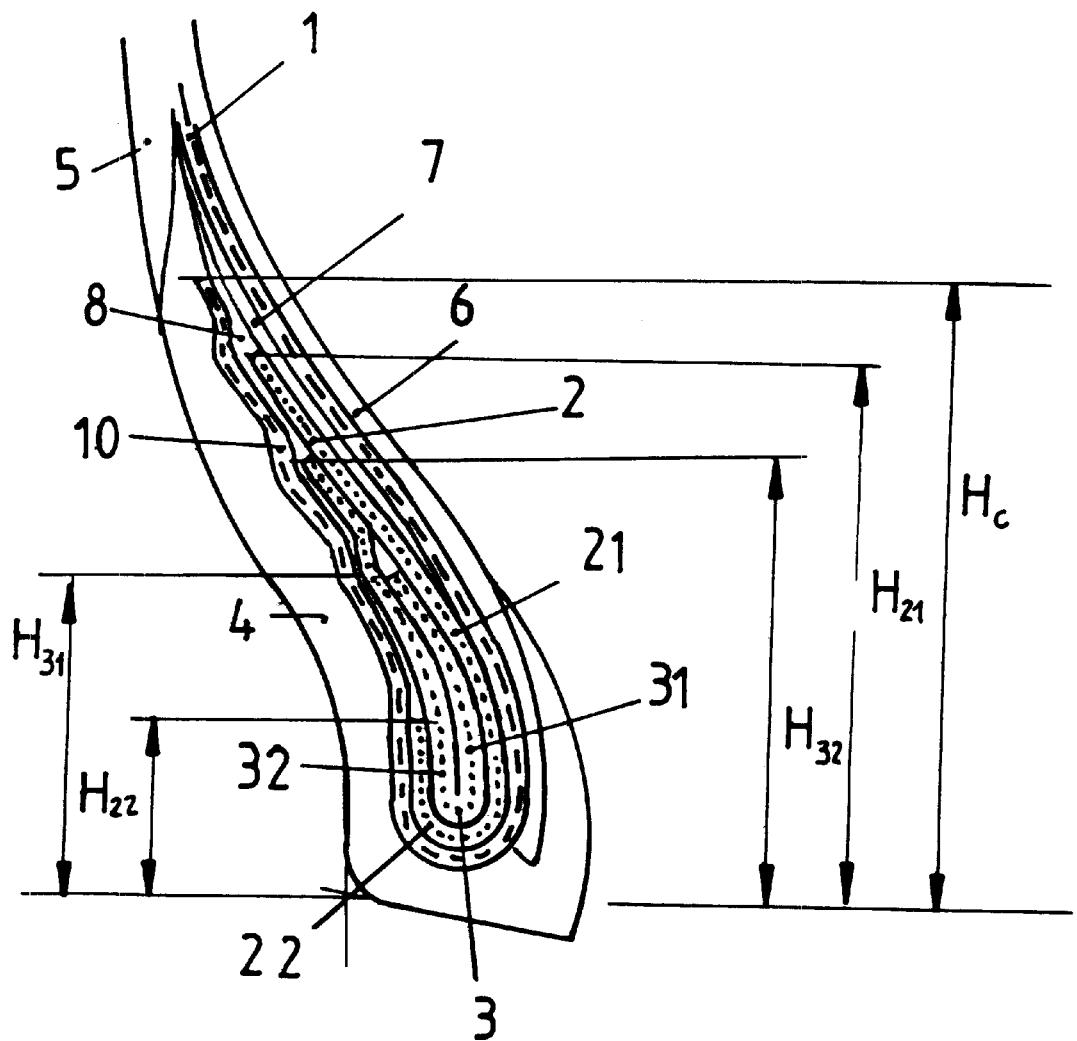
FIG. 1 is a schematic representation of the bead of a tire according to the invention, seen in meridian section.

The touring tire in the examples described, according to the invention, comprises a crown reinforcement (not shown) consisting in a known way of at least two crown plies of metallic or textile reinforcement elements parallel to one another in each ply and crossed from one ply to the next, which make angles with the circumferential direction which may range between 0° and 30°. The said reinforcement is covered by a tread connected to the beads by two side walls 5. The radial carcass reinforcement 1 (FIG. 1), which in the example described consists of a single ply of textile (polyester) cables and extends from one bead to the other, is such that its edges are turned up over themselves within each bead to form a turn-up 10 on each side of the equatorial plane. The said carcass reinforcement 1 is not wrapped around a bead wire, no bead wires being present, but is wrapped around the radially lower part of a reinforcement armature R for the bead.

The said reinforcement armature R consists of two plies 2 and 3 of textile reinforcement elements and more precisely aromatic polyamide cables. The first ply 2 is turned up over itself to form two layers: an axially internal layer 21 and an axially external layer 22. In the same way, the second ply 3 is turned up over itself to form two layers 31 and 32, the layer 31 being axially adjacent to the layer 21 of the first ply 2 and the layer 32 being axially adjacent to the layer 22. In each reinforcement ply 2, 3 the aromatic polyamide cables are parallel to one another and form an acute angle α with the circumferential direction, in other words an angle determined at any point of the cord between the direction of that cord and the tangent to a circle whose axis is the rotation axis of the tire and passing through the said point. For each layer 21, 22, 31, 32 the angle α varies as a function of the radial position of the measurement point, but is always greater than 0° and at most equal to 10°.

The plies 2 and 3 are arranged on the building drum of the bead reinforcement armature or carcass reinforcement blank such that, when the said two plies have been turned up, the axially interior layers 21 and 22 are formed of cables not only parallel to one another within each layer, but also parallel to one another from one layer 21 to the layer which is axially adjacent or closest to the next layer 31. While the cables of the two layers 21, 22 or 31, 32 of the same ply 2 or 3 are crossed relative to one another from one layer 21, 31 to the other layer 22, 32 of the same ply, the cables of the two axially external layers 22 and 32 respectively of the two plies 2 and 3 are parallel to one another from one layer 22 to the axially adjacent or closest layer 32.

Between the carcass ply 1 and the combination R are arranged two thin rubber sections 7 and 8 known as decoupling sections, of which the section 7 decouples the layer 21 from the main portion of the carcass reinforcement 1 while the section 8, which in the case described is reduced to a rubber layer of essentially uniform thickness, decouples the reinforcement layers 22, 31 and 32 from the turn-up 10 of the carcass ply 1. The value(s) of the secant modulus MA10 of the rubber sections 7 and 8 is/are preferably between the MA10 modulus of the calendering rubber of the reinforcement elements of the carcass reinforcement and the value(s) of the MA10 modulus of the calendering rubber of the elements of the reinforcement layers 21, 22, 31, 32, which is/are very appreciably higher.

The MA10 modulus is the modulus obtained for a given rubber mix by measuring the tensile stress for a relative elongation of 10%, the stress being determined in accordance with the AFNOR-NF-T46-002 standard of September 1988 under normal conditions of temperature and humidity according to the AFNOR-NF-T40-101 standard of December 1979.

The radially upper ends of the reinforcement layers 21, 22, 31, 32 are positioned at different heights $H_{21}$, $H_{22}$, $H_{31}$, $H_{32}$, the said heights being measured relative to the line parallel to the rotation axis of the tire passing through the point of intersection between the wall of the bead essentially perpendicular to the rotation axis and the generatrix of the bead's seat. As can be seen in FIG. 1, the above heights are such that on an annular reinforcement strip where there are at least two reinforcement layers 21 and 32, and in particular on the strip where there are only two reinforcement layers, the said two layers consist of reinforcement elements crossed from one layer to the next, the rigidity of the combination R being still very high in the case when two crossed layers are present. The arrangement of the ends of the various reinforcement layers makes it possible to maintain the circumferential tensile rigidity and the tensile rupture strength required for the replacement of the usual bead wire in a tire of the same size, while at the same time, because of the fact that the two reinforcement plies are positioned with their elements parallel from one ply to the next during the build-up of the reinforcement armature blank, the whole is easier to fabricate in the sense that the positioning coordinates of the products constituting the bead are better respected. As for the value of the height $H_c$ of the turn-up of the carcass ply 1, in the example described this is greater than all the values mentioned above, so that the turn-up 10 axially covers all the ends of the layers 21, 22, 31, 32 and so has an edge axially adjacent to the main portion of the carcass ply.

The structure of the bead is completed on the one hand by a layer 6 of interior lining and on the other hand by a rubber section 4 which protects the bead. In the vulcanized condition the protection layer 4 has a dynamic elastic loss modulus G" less than 1, G" being expressed in MPa (megapascals); in the case described, the modulus G" is equal to 0.08 MPa and is therefore small compared with the modulus of the corresponding sections of classical beads with conventional bead wires, the latter modulus generally being equal to at least 1. As for the thickness of the said section 4, this is equal to 1.5 mm at the level of the rim flange. The use of a section 4 with low elastic loss modulus G" and small thickness in the outer zone of the bead, which is made possible due to the rigidity of the reinforcement armature R extending throughout the bead, leads to considerable reduction of the rolling resistance without in any way altering the effectiveness with which the tire is maintained on the rim.

Figure 2:
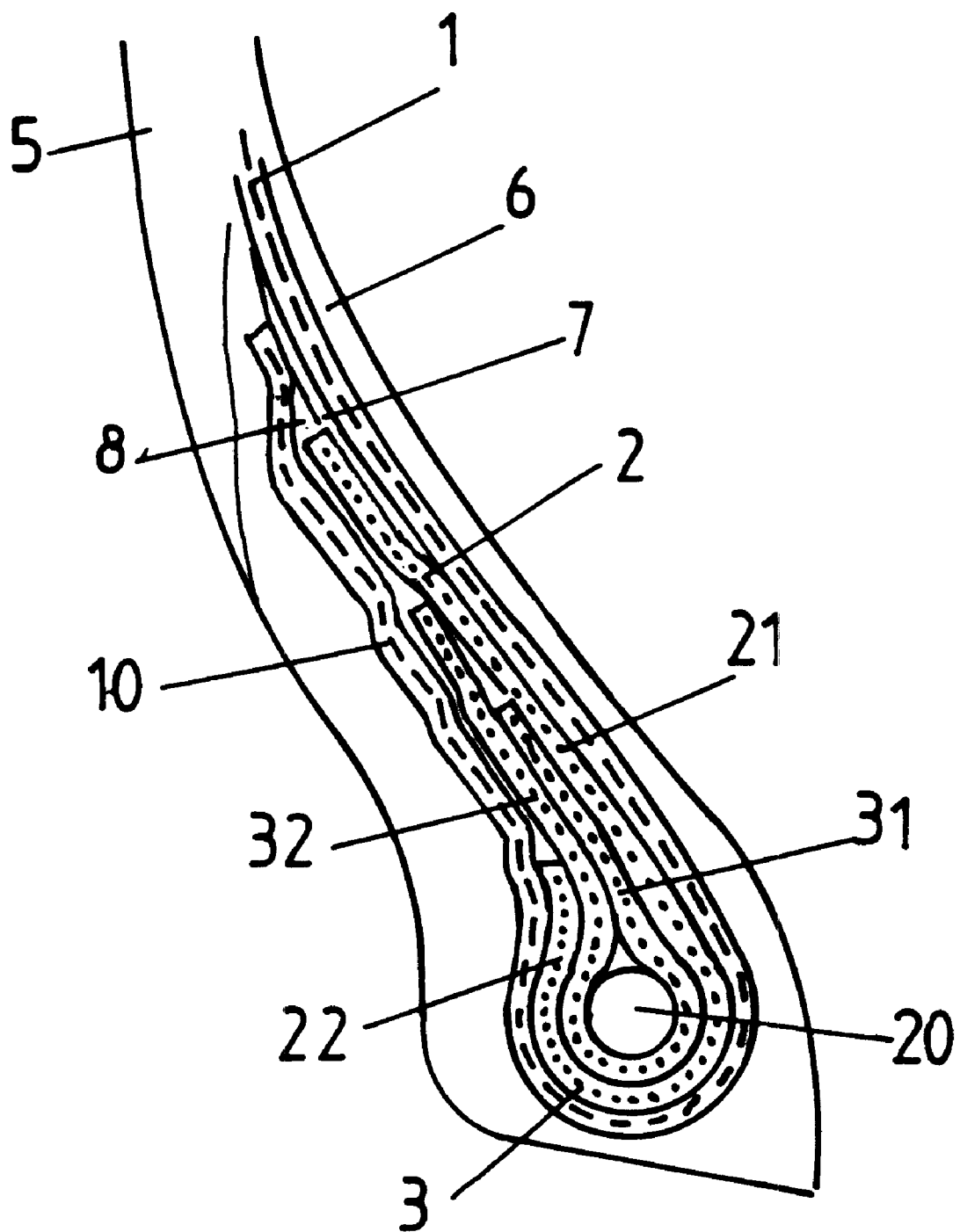

FIG. 2 shows a variant which uses an annular element such as that described in the above cited European application. The reinforcement plies 2 and 3 are wrapped around the said annular element 20 to form on the one hand the two axially interior layers 21 and 31, and on the other hand the axially exterior layers 22 and 32. In other respects the architecture of the bead is identical to that described earlier and relative to the bead shown in FIG. 1 in which the carcass ply 1 is wrapped around the reinforcement armature (or alternatively around an annular element 20).

The tensile rupture strength of the annual element 20 measured in the circumferential direction is advantageously less than 300 daN, that is to say, very considerably lower than would be necessary for a bead wire in a known tire of the same size, and the tensile rupture strength of the armature R of the reinforcement plies measured in the circumferential direction is at least equal to that which would be necessary for a bead wire in a known tire of the same size, in other words a touring tire in the case of the examples described, and advantageously higher than 1000 daN, such that the mechanical strength of the annular element 20 does not necessarily contribute to the mechanical strength of the combination R. However, the said tensile rupture strength is chosen so as to permit the usual operations of building, turning up, shaping and vulcanization of the tire. The annular element 20 may thus consist, for example, of a circular cord whose axis is the rotation axis of the tire. The said cord may be monofilamentary or multifilamentary, textile or metallic, and made to be as light as possible; a hollow metallic cord is a preferred solution because it combines the two sought properties of lightness and volume. The annular element 20 may also be a cable of a textile material, for example made of an aromatic polyamide, or a mineral material, for example glass. It may also be replaced by a section of rubber mix having a high elastic secant tensile modulus and very high hardness: for example a mix with modulus MA10 higher than 15 MPa at 10% relative elongation is perfectly suitable. The said section may be only an addition to the annular element consisting of a cord, cable or strip, designed to fill the bead more effectively.

Figure 3:
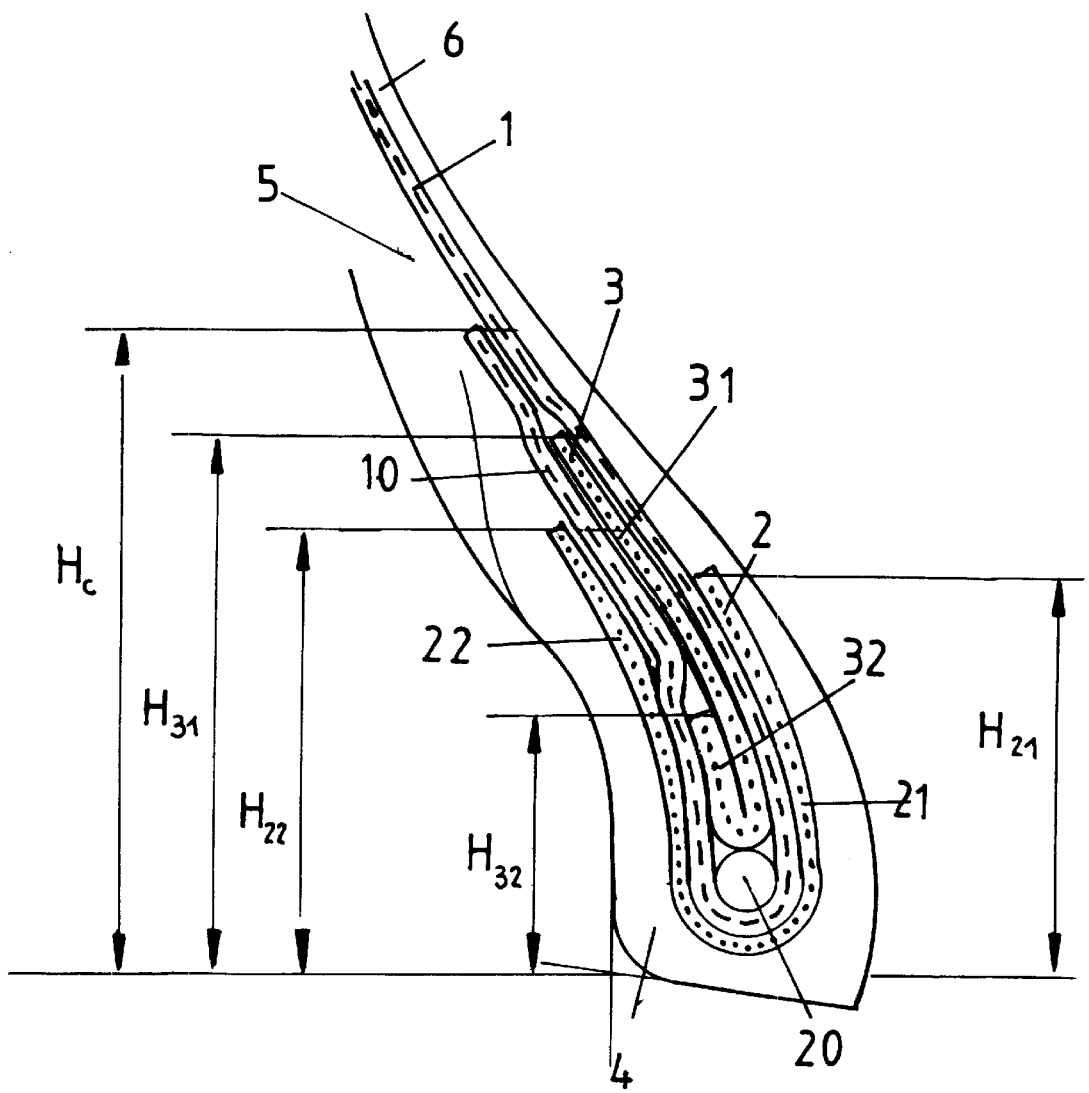
FIG. 3 is a schematic representation of a third variant according to the invention.

The tire bead shown in FIG. 3 differs from that shown in FIG. 2 and described above in three characteristics, which are:

the position of the annular element 20 relative to the reinforcement layers, the respective radial positions of the radially upper ends of the reinforcement layers 21, 22, 31, 32, the axial position of the carcass ply relative to the reinforcement layers.

The second reinforcement ply 3 is not wrapped around the annular element 20 but is simply turned up over itself to form the layers 31 and 32, while the first ply 2 is wrapped around the said annular element. While the sequence of values of the heights of the reinforcement layer ends, in the example shown in FIG. 1, was $H_{22}$, $H_{31}$, $H_{32}$ and $H_{21}$ in increasing order, in the example of FIG. 3 the sequence is $H_{32}$, $H_{21}$, $H_{22}$ and $H_{31}$. Besides, the carcass ply 1 wrapped around the annular element 20 is sandwiched between the two plies 2 and 3, both these being also turned up, with the main portion of the ply being inserted between the layers 21 and 31 and with the turn-up 10 of the carcass ply inserted between the layers 22 and 32. Such an arrangement, while preserving the tensile rigidity properties of the armature R and improving the precision of the positions of the tire's constituents and so achieving better regularity of the quality of the manufactured tires, also makes it possible to position the carcass reinforcement close to the neutral fiber of the complex formed by the two armatures, namely the carcass reinforcement and the bead reinforcement, and so limits the transit of the carcass reinforcement into compression in the bead zone during its passage through the contact area.

Each edge of the carcass reinforcement 1 can also be inserted between the axially interior and axially exterior reinforcement layers (not shown). Two structural cases may exist: either the edge of the said carcass reinforcement is turned up to form a fold and the main portion and the fold are then held axially between the said layers, or the edge is not folded and therefore has no turn-up.

We claim:

1. A tire in which a radial carcass reinforcement is overlaid radially by a crown reinforcement, itself radially covered by a tread, and connected by two side walls to two beads, each of which has no anchoring bead wire, and with the said carcass reinforcement extending from one bead to the other, characterized in that:

each bead is reinforced by an armature comprising at least two plies turned up over themselves to form four reinforcement layers axially close to one another, each of the said layers comprising reinforcement elements parallel to one another within each layer and making with the circumferential direction an angle α such that $0°<\alpha\leq10°$, the two axially innermost layers being composed of elements parallel to one another from one layer to the next, and the two layers axially at the center of the armature being composed of elements crossed from one layer to the next, such that the armature R of reinforcement layers has a tensile rupture strength measured in the circumferential direction at least equal to the strength necessary for a bead wire in a known tire of the same size, and the reinforcement layers have their radially outer ends positioned within the bead at different heights $H_{21}$, $H_{22}$, $H_{31}$, $H_{32}$, such that any annular strip of the reinforcement armature of the bead, comprising at least two layers of reinforcement elements and lying between two parallels to the rotation axis of the tire, is formed of at least two layers of reinforcement elements crossed from one layer to the next.

2. A tire according to claim 1, characterized in that:

the bead comprises an annular element whose tensile rupture strength in the circumferential direction is considerably less than the tensile rupture strength, measured in the same direction, of the reinforcement armature, the axis of the said annular element being the rotation axis the tire.

3. A tire according to either of claims 1 or 2, characterized in that each edge of the carcass reinforcement, whether with or without a turn-up, is held axially between the two axially internal layers and the two axially external layers.

4. A tire according to either of claims 1 or 2, characterized in that the carcass reinforcement is wrapped around the radially lower end of the reinforcement armature of the bead.

5. A tire according to either of claims 1 or 2, characterized in that a turn-up of the carcass reinforcement is inserted between the two axially external layers, while the main portion of the carcass reinforcement corresponding to it is inserted between the two axially internal layers.

6. A tire according to either of claims 1 or 2, characterized in that the section that covers externally and at least axially the part of the bead designed to come into contact with a mounting rim, at least in the area of a rim flange when the tire is fitted, is made from a rubber mix which, in the vulcanized condition, has a dynamic elastic loss modulus G" less than 1, G" being expressed in MPa (megapascals), the said modulus being measured at 10% shear, at a temperature of 50° C. and with a frequency of 10 Hz, the thickness of the said section being at most equal to 2 mm.

* * * * *

UNITED STATES PATENT AND TRADEMARK OFFICE
CERTIFICATE OF CORRECTION

PATENT NO. : 6,505,663 B2  
DATED : January 14, 2003  
INVENTOR(S) : Ahouanto et al.

It is certified that error appears in the above-identified patent and that said Letters Patent is hereby corrected as shown below:

Title page,  
Item [56], References Cited, insert:  
-- FOREIGN PATENT DOCUMENTS  
(AU)   1484795        9/1995 --

Column 1,  
Line 14, "for" should read -- form --  
Line 42, "fist" should read -- first --

Column 2,  
Line 21, "αsuch" should read -- α such --

Column 3,  
Line 12, "aramide" should read -- aramid --

Column 5,  
Line 59, "32," should read -- 32, and --

Signed and Sealed this

Twenty-fourth Day of June, 2003

JAMES E. ROGAN  
*Director of the United States Patent and Trademark Office*